United States Patent
Zhang et al.

(10) Patent No.: US 12,511,355 B2
(45) Date of Patent: Dec. 30, 2025

(54) UNLOCKING A LOCKED FIRMWARE SETUP UTILITY USING MULTI-FACTOR AUTHENTICATION SUPPORTED BY A BASEBOARD MANAGEMENT CONTROLLER

(71) Applicant: Lenovo Enterprise Solutions (Singapore) Pte Ltd., Singapore (SG)

(72) Inventors: Caihong Zhang, Shanghai (CN); Fred Allison Bower, III, Durham, NC (US)

( * ) Notice: Subject to any disclaimer, the term of this patent is extended or adjusted under 35 U.S.C. 154(b) by 273 days.

(21) Appl. No.: 18/487,261

(22) Filed: Oct. 16, 2023

(65) Prior Publication Data
US 2024/0362305 A1   Oct. 31, 2024

Related U.S. Application Data

(63) Continuation of application No. PCT/CN2023/090751, filed on Apr. 26, 2023.

(51) Int. Cl.
G06F 21/31     (2013.01)
G06F 9/4401    (2018.01)

(52) U.S. Cl.
CPC ............ *G06F 21/31* (2013.01); *G06F 9/4401* (2013.01)

(58) Field of Classification Search
None
See application file for complete search history.

(56) References Cited

U.S. PATENT DOCUMENTS 9,213,825 B1 * 12/2015 Gysin ..................... G06F 21/36
9,779,230 B2 * 10/2017 Hamlin ............... G06F 21/6218
10,628,176 B1 * 4/2020 Santharam ............ G06F 9/4401
12,292,958 B2 * 5/2025 Tsai ...................... G06F 21/572
2006/0085845 A1 * 4/2006 Davis ..................... G06F 21/31
                                                        726/6

(Continued)

FOREIGN PATENT DOCUMENTS

| CN | 112328299 A | 2/2021 | |
| WO | WO-2016018390 A1 * | 2/2016 | ............ G06F 21/575 |
| WO | WO-2024048228 A1 * | 3/2024 | ............. G06F 21/45 |

OTHER PUBLICATIONS

International Search Report and Written Opinion dated Dec. 26, 2023 for International Application No. PCT/CN2023/090751 having an international filing date of Apr. 26, 2023 (8 pages).

*Primary Examiner* — James R Turchen
(74) *Attorney, Agent, or Firm* — Jeffrey L. Streets (57) ABSTRACT

A method for unlocking a firmware setup utility of a computer server without a firmware setup utility user password. The method includes booting the server to a firmware setup utility interface and receiving a user request to unlock the firmware setup utility without the password. The method further includes receiving, via a web interface to a baseboard management controller (BMC) of the server, login credentials for accessing a BMC configuration, wherein the login credentials are authenticated by the BMC. The firmware setup utility causes, in response to the request, the BMC to send a nonce code to a registered destination address stored by the BMC. User input containing the nonce code is received through the web interface to the BMC, and the firmware setup utility is unlocked in response to determining that the nonce code received through the BMC web interface matches the nonce code in the message.

20 Claims, 6 Drawing Sheets

(56) References Cited

U.S. PATENT DOCUMENTS

| | | | | |
|---|---|---|---|---|
| 2017/0185780 A1* | 6/2017 | Kao | ................... | H04L 63/102 |
| 2019/0065786 A1* | 2/2019 | Young | ................... | H04L 9/3247 |
| 2021/0382996 A1* | 12/2021 | Jeansonne | ............. | H04L 9/0825 |
| 2022/0180007 A1* | 6/2022 | Huang | ................... | G06F 21/82 |
| 2022/0229896 A1* | 7/2022 | Shachar | ................ | G06F 21/72 |
| 2022/0278855 A1* | 9/2022 | Jacquin | ................ | H04L 9/3247 |

* cited by examiner

UNLOCKING A LOCKED FIRMWARE SETUP UTILITY USING MULTI-FACTOR AUTHENTICATION SUPPORTED BY A BASEBOARD MANAGEMENT CONTROLLER

BACKGROUND

The present disclosure relates to systems and method of unlocking a locked firmware setup utility.

BACKGROUND OF THE RELATED ART

A Basic Input/Output System (BIOS) is a firmware program that is stored on an Erasable Programmable Read-Only Memory (EPROM) and is automatically executed by the central processing unit (CPU) as soon as a computer is turned on. The BIOS code causes the CPU to perform "boot services", such as hardware initialization, during a computer booting process and provides "runtime services" to an operating system. For example, the BIOS code includes instructions for the Power-on self-test (POST) that initializes and tests the system hardware components. The BIOS also loads a boot loader from data storage so that the boot loader can subsequently initialize the operating system software.

A Unified Extensible Firmware Interface (UEFI) is a publicly available specification for a software interface between an operating system and platform firmware. UEFI is compatible with the BIOS and may replace many of the functions of the BIOS in some computers while enabling additional functionality. As the UEFI takes on greater functionality, the BIOS may become a lightweight BIOS. For example, UEFI may support additional hardware such as large storage devices, provides faster boot times, enables 32 bit and 64 bit modes, and provides enhanced security features such as Secure Boot.

While a Windows, Linux or Mac password just prevents others from logging into the operating system, the firmware system (BIOS/UEFI) offers the ability to set lower-level passwords. For example, requiring entry of a firmware setup utility password may prevent an unauthorized individual from booting the computer, booting from a removable device, and/or changing BIOS/UEFI settings and system configuration. Entry of the firmware setup utility password may also be required to unlock the firmware setup utility and enable the system to boot following the detection of tampering with the system configuration. Unfortunately, resetting a forgotten firmware setup utility password typically requires physically accessing a reset feature, such as an electrical jumper, that is located inside the computer chassis. Furthermore, resetting the firmware setup utility password in this manner results in a clearing of all firmware settings. These security concerns and challenges may be heightened in both edge and Infrastructure as a Service (IaaS) environments, since there may be less control over who can gain access to the computing devices and there may be more opportunity for unauthorized tampering.

BRIEF SUMMARY

Some embodiments provide a method for unlocking a firmware setup utility of a computer server without entry of a firmware setup utility user password. The method comprises booting the computer server to a user login interface of the firmware setup utility and receiving, via the user login interface of the firmware setup utility, a user request to unlock the firmware setup utility without entry of a firmware setup utility user password. The method further comprises receiving user login credentials for accessing a BMC configuration. Still further, the method includes the firmware setup utility instructing, in response to receiving the user request, the BMC to send a message containing a nonce code through a network interface controller of the computer server to a registered destination address stored by the BMC. In addition, the method includes receiving user input containing the nonce code and unlocking the firmware setup utility in response to determining that the nonce code received through the user input matches the nonce code contained in the message sent to the registered destination address.

Some embodiments provide a computer program product comprising a non-volatile computer readable medium and non-transitory program instructions embodied therein, the program instructions being configured to be executable by a processor of a baseboard management controller to cause the processor to perform various operations. The operations comprise receiving, from a firmware setup utility running on a computer server, a nonce code and an instruction for the baseboard management controller to send a message containing the nonce code to a registered destination address stored by the baseboard management controller. The operations further comprise sending the message containing the nonce code through a network interface controller of the computer server to the registered destination address, authenticating user credentials input by a user through a baseboard management controller web interface for logging into the baseboard management controller, receiving user input including the nonce code via the web interface, and providing the nonce code received via the web interface to the firmware setup utility.

Some embodiments provide a computer program product comprising a non-volatile computer readable medium and non-transitory program instructions embodied therein, the program instructions being configured to be executable by a processor to cause the processor to perform various operations. The operations comprise loading a firmware setup utility having a user login interface, and receiving, via the user login interface of the firmware setup utility, a user request to unlock the firmware setup utility without entry of a firmware setup utility user password. The operations further comprise providing a first nonce code to a baseboard management controller of the computer server and instructing the baseboard management controller to send a message containing the first nonce code to a registered destination stored by the baseboard management controller, wherein the message is sent to the registered destination through a network interface controller of the computer server. Still further, the operations comprise receiving, from the baseboard management controller, a second nonce code that was input by the user and unlocking the firmware setup utility in response to determining that the second nonce code received from the baseboard management controller matches the first nonce code provided to the baseboard management controller.

DETAILED DESCRIPTION

Some embodiments provide a method for unlocking a firmware setup utility of a computer server without entry of a firmware setup utility user password. The method comprises booting the computer server to a user login interface of the firmware setup utility and receiving, via the user login interface of the firmware setup utility, a user request to unlock the firmware setup utility without entry of a firmware setup utility user password. The method further comprises receiving user login credentials for accessing a BMC configuration. Still further, the method includes the firmware setup utility instructing, in response to receiving the user request, the BMC to send a message containing a nonce code through a network interface controller of the computer server to a registered destination address stored by the BMC. In addition, the method includes receiving user input containing the nonce code and unlocking the firmware setup utility in response to determining that the nonce code received through the user input matches the nonce code contained in the message sent to the registered destination address.

In some embodiments, the computer server may have its system configuration established and password protected by the firmware setup utility at a point in time where the custody and system configuration are trusted. For example, the custody and system configuration may be trusted when the computer server is located at an initial installation facility. For example, a system integrator that is installing a new computing system may have full control over the system setup and configuration until the system is released to the customer for use. The system configuration data may be stored in a tamper-evident fashion within persistent firmware storage on the computer server such that any tampering with the system configuration of the computer server may be automatically detected during execution of the firmware code, such as during a power-on self-test (POST) process of a basic input-output system (BIOS) or a portion of a unified extensible firmware interface (UEFI) process.

During a startup of the computer server following establishment of the system configuration, the firmware code, such as the BIOS and/or UEFI ("BIOS/UEFI") code, may cause a central processing unit ("CPU" or "processor") of the computer server to verify that the firmware settings within the system configuration have not been tampered with and to also verify that an actual physical (hardware) state of the system matches the expected system configuration. If there is evidence of tampering with the firmware settings within the system configuration or if the current physical state of the system does not match the expected system configuration, then the computer system may be prevented from booting the operating system until the system configuration has been recertified as trusted. For example, the firmware may record the physical topology of the system, including unique identification of pluggable options, and recognize any changes in the physical topology that may occur between firmware cycles.

In some embodiments, tampering with the system configuration may be detected by using a checksum function to calculate a checksum of the system configuration during each boot process, storing the current checksum, then detecting any change in the checksum from one boot process to the next. Optionally, the checksum function may be a cryptographic hash function. A checksum from a current boot process that matches the checksum from the most-recent prior boot process verifies the data integrity of the system configuration (i.e., there has been no change is the system configuration since the last checksum was calculated). Furthermore, the checksum may be updated and stored each time there is an authorized change in the system configuration.

Recertification of trust may require a system administrator (personnel or "user") to enter the firmware setup utility password into a firmware (BIOS/UEFI) interface. For the entered firmware setup utility password to be accepted, the entered firmware setup utility password must match the firmware setup utility password that is stored by the firmware setup utility to protect the system configuration. The firmware setup utility password must also be entered to enable a legitimate change to the system configuration since the system configuration is stored in the protected system configuration area of the firmware storage. However, if the firmware setup utility password has been forgotten, the firmware setup utility password must be reset before affecting recertification of an existing system configuration or establishing changes to the system configuration.

In some embodiments, the firmware setup utility password that protects the system configuration may be reset or authenticated using a multi-factor authentication process supported by the BMC. For example, a first factor of authentication may include entry of a user identification ("user ID" or "username") and password combination and a second factor of authentication may include entry of a challenge response that is sent to a registered destination address, such as an email address or mobile phone number. However, no aspect of the multi-factor authentication process may rely upon the operating system or a software application program since detection of tampering or a mismatched system configuration (i.e., actual hardware does match the expected hardware) will cause the firmware setup utility to become locked, and prevent the boot process from progressing, before the operating system and any application programs are loaded. Furthermore, the operating system and any application program may be prevented from loading until the firmware setup utility has been unlocked. Accordingly, the system firmware is unable to use any of the services of the operating system or application program to reset or authenticate the firmware setup utility password once the firmware setup utility has become locked due to the tampering or mismatch.

In some embodiments, the multifactor authentication process may include a first authentication factor and a second authentication factor. The first authentication factor may be the correct entry of the BMC account credentials that are used to successfully login to the BMC. The second authentication factor may be entry of a code that matches the nonce code that was sent from the firmware setup utility to the registered destination address via the BMC.

The BMC configuration may store a registered destination address that may be used by the BMC to send a message to the registered destination address. The message may be an email message and may include the nonce code obtained from the firmware setup utility. Furthermore, the registered destination address may belong to an individual person or user, such as a data center administrator.

The person receiving the message may login to the BMC web interface using their BMC login credentials (such as a username and a password) then enter the nonce code (the "entered nonce code") from the received message into the BMC web interface. The BMC may then pass the entered nonce code to the firmware setup utility. The firmware setup utility may then compare the entered nonce code received via the BMC against the nonce code previously provided to the BMC. If the entered nonce code matches the nonce code previously provided, then the firmware setup utility will be unlocked to enable access and changes to the system configuration and/or provide any other access as if the firmware setup utility password had been successfully entered into the user interface to the firmware setup utility.

The registered destination address may be a locked value that is part of the BMC configuration, such that the registered destination address cannot be modified using just the BMC login credentials (which would degrade the security to only single factor authentication). Rather, any change in the registered destination address requires successful entry of the BMC credentials and successful entry of the firmware setup utility user password or successful completion of the presently disclosed multi-factor authentication.

When a user, such as the data center administrator, forgets the current firmware setup utility password, the user is unable to directly unlock the firmware setup utility by entry of the firmware setup utility password through the user interface of the firmware setup utility. However, the user may interact with the user interface of the firmware setup utility to initiate an access recovery process. The access recovery process enforced by the firmware requires multi-factor authentication, as an alternative to the direct entry of the current firmware setup utility password, for resetting a new firmware setup utility password and/or unlocking the firmware setup utility. Upon initiation of the access recovery process, the firmware setup utility instructs the BMC to send a message to the registered destination address that is stored in the BMC configuration and locked using the firmware setup utility password. The message includes a nonce code that is provided by the firmware setup utility to the BMC. For example, the nonce code may be generated by a nonce generator that is part of the firmware setup utility code in response to receiving the user request to unlock the firmware setup utility. The message may also include a prompt instructing the recipient to log into a BMC web interface using their BMC account credentials, such as a username and BMC password. The username and BMC password are BMC account credentials that are used to gain access to the BMC and serve as the first authentication factor. However, the BMC account credentials are independent of the firmware setup utility password that is necessary to reset or access and modify the system configuration stored by the firmware.

A BMC web interface may be displayed on a web browser using the Internet Protocol (IP) address configured in the BMC interface. After the user has successfully logged into the BMC web interface, the user may enter the nonce code that they received in the message. The BMC receives the user-entered code and sends the user-entered code to the firmware setup utility. The firmware setup utility compares the user-entered code received from the BMC against the stored nonce code that was previously generated by the firmware setup utility and provided to the BMC for sending to the registered destination. If the codes match, then this serves as the second authentication factor and the locked firmware setup utility is unlocked. With the firmware setup utility unlocked, the user may be able to view or update their firmware setup utility password and/or confirm/change the system configuration including the firmware settings and the hardware configuration.

In some embodiments, the firmware setup utility is a setup utility for a basic input-output system and/or a unified extensible firmware interface. In one option, the operation of unlocking the firmware setup utility may include unlocking a locked system configuration for the computer server.

In some embodiments, the operations may further include allowing, in response to unlocking the firmware setup utility, the user to establish a new firmware setup utility user password, confirm the system configuration and/or modify the system configuration. Optionally, the firmware that includes the firmware setup utility and the system configuration may be stored on an erasable programmable read-only memory (EPROM) of the computer server.

In some embodiments, the user login credentials for accessing a baseboard management controller configuration are entered and received by the baseboard management controller through a baseboard management controller web interface. Subsequently, the user input containing the nonce code may be input and received by the baseboard management controller through the baseboard management controller web interface. Then, the BMC may pass the user input containing the nonce code to the firmware setup utility. The firmware setup utility may then make the determination whether the nonce code received through the BMC web interface matches the nonce code contained in the message sent to the registered destination address.

In some embodiments, the user login credentials for accessing a baseboard management controller configuration may be entered and received into an interface to the firmware setup utility. Such login credentials may then be verified with the BMC. Similarly, the user input containing the nonce code may be received directly into the firmware setup utility.

In some embodiments, the operations may further include automatically determining, during booting of the computer server, whether there have been any unauthorized changes in the system configuration and/or physical state of the computer server since a previous booting of the computer server. In one example, the computer server may automatically boot to the user login interface of the firmware setup utility in response to determining that there has been an unauthorized change in the system configuration and/or physical state of the computer server since a previous booting of the computer server.

Some embodiments provide a computer program product comprising a non-volatile computer readable medium and non-transitory program instructions embodied therein, the program instructions being configured to be executable by a processor of a BMC to cause the processor to perform various operations. The operations comprise receiving, from a firmware setup utility running on a computer server, a nonce code and an instruction for the BMC to send a message containing the nonce code to a registered destination address stored by the BMC. The operations further comprise sending the message containing the nonce code through a network interface controller of the computer server to the registered destination address, authenticating user credentials input by a user through a BMC web interface for logging into the BMC, receiving user input including the nonce code via the web interface, and providing the nonce code received via the web interface to the firmware setup utility.

Some embodiments provide a computer program product comprising a non-volatile computer readable medium and non-transitory program instructions embodied therein, the program instructions being configured to be executable by a processor to cause the processor to perform various operations. For example, the processor may be the central processing unit (CPU) of a computer server and the program instructions may be those of the firmware setup utility of the BIOS/UEFI firmware. After loading a firmware setup utility having a user login interface, the operations may comprise receiving, via the user login interface of the firmware setup utility, a user request to unlock the firmware setup utility without entry of a firmware setup utility user password. The operations further comprise providing a first nonce code to a BMC of the computer server and instructing the BMC to send a message containing the first nonce code to a registered destination stored by the BMC, wherein the message is sent to the registered destination through a network interface controller of the computer server. Still further, the operations comprise receiving, from the BMC, a second nonce code that was input by the user and unlocking the firmware setup utility in response to determining that the second nonce code received from the BMC matches the first nonce code provided to the BMC.

In some embodiments, the operation of unlocking the firmware setup utility may include unlocking a locked system configuration for the computer server. Some embodiments may further include allowing, in response to unlocking the firmware setup utility, the user to establish a new firmware setup utility user password, confirm the system configuration and/or modify the system configuration.

The foregoing computer program products may further include program instructions for implementing or initiating any one or more operations of the methods described herein and the foregoing methods may further include any of the operations of the computer program products. Furthermore, embodiments may include a computer server that is configured to perform the operations of the computer program products and/or the methods described herein.

Figure 1:
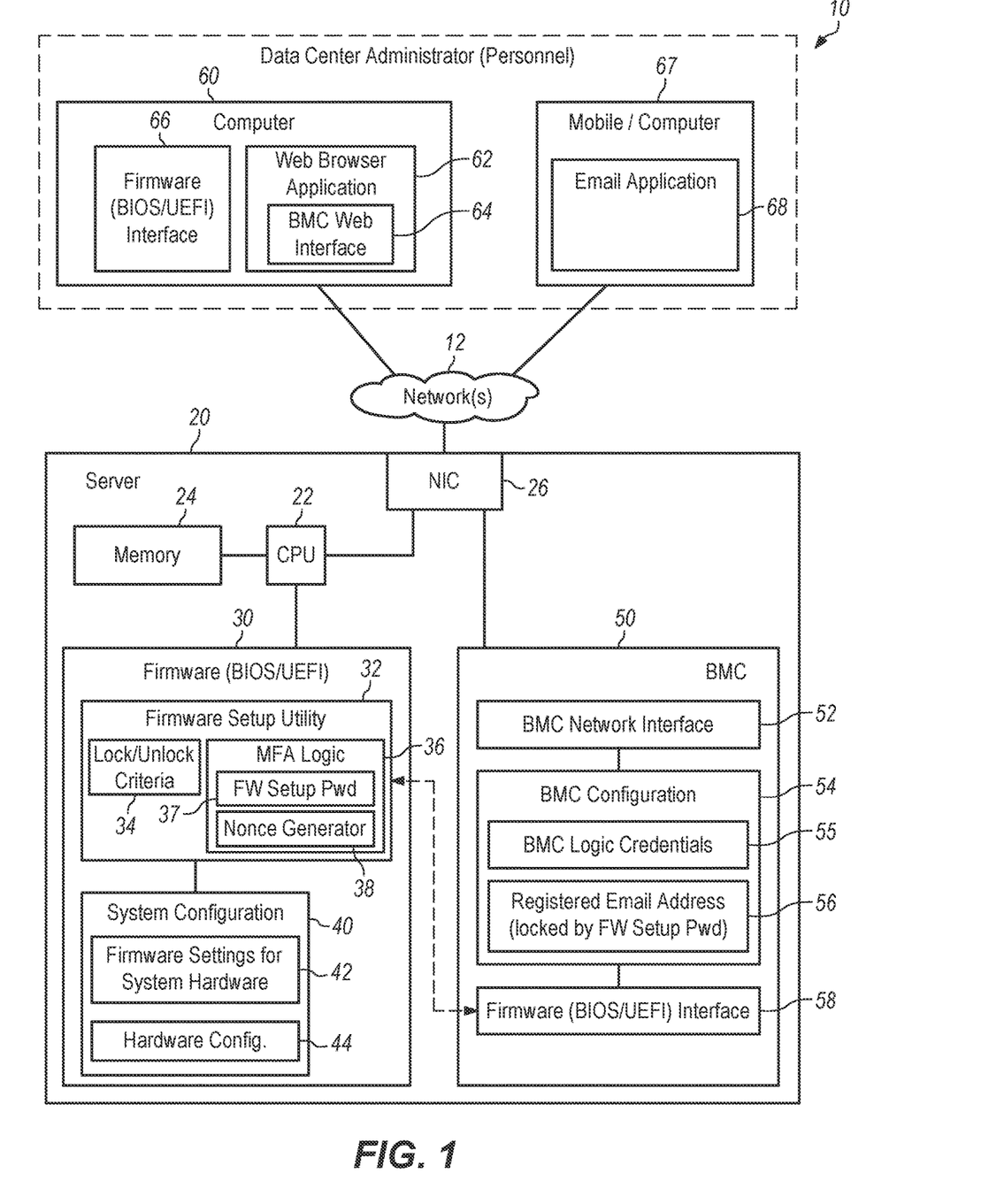
FIG. 1 is a diagram of a system including a computer server according to some embodiments.

FIG. 1 is a diagram of a system 10 including a computer server 20 according to some embodiments. The computer server 20 is in communication with a computer 60 and a mobile communication device 67 over one or more network 12. The computer 60 and the mobile communication device 67, such as a smartphone, are accessible to a data center administrator or a similarly authorized person, who may be referred to herein as a "user." For example, the data center administrator may have login credentials to both devices 60, 67. Furthermore, the data center administrator ("user") may have login credentials to a BMC web interface, a firmware setup utility interface, and an email application. Optionally, the email application could be on the computer 60 or some other device.

The computer server 20 includes a central processing unit (CPU) 22, memory 24, a network interface controller (NIC) 26, firmware 30 including a basic input-output system (BIOS) and/or unified extensible firmware interface (UEFI), and a baseboard management controller (BMC) 50. Both the CPU 22 and the BMC 50 are able to access the network 12 through the NIC 26 (or separate NICs), but the BMC 50 receives standby power even when the computer server 20 is turned "off" and the CPU 22 is not running. Accordingly, the BMC 50 is able to support a remote connection with a computer 60 operated by the data center administrator so long as the computer server 20 is connected to a power source and the network 12.

The firmware (BIOS/UEFI) 30 may include an EPROM and/or other data storage that stores a firmware setup utility 32 and the system configuration 40. During a boot process for the computer server 20, the CPU 22 loads and runs the firmware (BIOS/UEFI) code prior to loading an operating system and any application programs. Therefore, the CPU 22 runs the firmware setup utility 32, which may provide access control logic that includes lock/unlock criteria 34 and multi-factor authentication logic 36. The lock/unlock criteria 34 may include logic to determine whether the system configuration 40 has experienced tampering (i.e., an unauthorized change in the system configuration 40 or physical hardware configuration of the computer server 20. For example, the system configuration 40 may include firmware settings 42 for the system hardware and a hardware configuration 44. If a checksum or hash value is calculated and stored after each authorized change in the firmware settings 42, then the firmware may cause the CPU to calculate a new checksum or hash value during boot. If the new checksum or hash value calculated during boot matches the stored checksum or hash value, then it is determined that there has not been any unauthorized tampering or change in the firmware settings 42. However, if the new checksum or hash value calculated during boot does not match the stored checksum or hash value, then it is determined that there has in-fact been unauthorized tampering or change in the firmware settings 42 such that the lock/unlock criteria 34 may cause the firmware setup utility 32 to become "locked" and the boot process unable to continue to point of loading the operating system. A firmware setup utility password (shown at 37; alternatively, "BIOS/UEFI password") may be used to unlock the firmware setup utility. However, if the firmware setup utility password 37 has been forgotten, then it may be necessary to reset the password before continuing.

According to some embodiments, the firmware setup utility 32 may include multi-factor authentication (MFA) logic 36 to support a process to unlock the firmware setup utility 32 and allow the boot process to continue. Multi-factor authentication requires, as the name implies, that a user be authenticated by more than one form (factor) of authentication. In some embodiments, the first authentication factor may be the user's BMC login credentials and the second authentication factor may be a nonce code. Accordingly, the MFA logic 36 may determine that an entered password does not match the firmware setup utility password 37, then use a nonce generator (logic) 38 to generate a nonce code that is provided to the BMC 50.

The BMC 50 may include a BMC network interface 52, a BMC configuration 54, and a firmware (BIOS/UEFI) interface 58. The BMC network interface 52 may be responsible for handling input/output via the NIC 26, and the firmware interface 58 may be responsible for handling communications with the firmware 30. The BMC configuration 54 may include various settings and logic but may also store BMC login credentials 55 and a registered destination address (email address) 56 that is locked with the firmware setup utility password 37. Accordingly, the registered destination address (email address) 56 can only be changed by a user having successfully entered both the authorized BMC login credentials 55 and the firmware setup utility password 37.

The computer 60 may run a web browser application 62 to access a BMC web interface 64. For example, the BMC 50 may be assigned an Internet Protocol (IP) address. A user may access the BMC web interface by entering the IP address of the BMC 50 into the web browser 62 and then enter the BMC login credentials 55. If the entered BMC login credentials match the BMC login credentials 55 stored in the BMC configuration 54, then the user is authenticated to access the data and services of the BMC 50.

The mobile communication device or computer 67 may be setup to receive email associated with the registered email address 56. Therefore, if the BMC 50 sends an email to the registered email address 56, the email will be sent through the NIC 26 and over the network(s) 12 to the mobile communication device 67. Only the authorized user should have access to the email that is directed to the registered email address.

So, if the firmware setup utility 32 of the firmware (BIOS/UEFI) 30 has determined that the lock/unlock criteria 37 has been violated (i.e., there has been unauthorized tampering) and the user has requested access recovery via a firmware (BIOS/UEFI) interface 66 (perhaps due to a forgotten firmware setup utility password), the MFA logic 36 may use a nonce generator 38 to generate a nonce code and provide that nonce code to the firmware interface 58. The BMC 50 may then send an email message containing the nonce code to the registered email address 56 such that the email is directed to the mobile communication device or computer 67 accessible to the authorized user. The user may view the email message received at the email application 68 associated with the registered email address 56 and obtain the nonce code. The user may then access the BMC web interface and successfully enter the BMC login credentials 55 (the first factor of authentication) to gain access to the BMC 50 data and services and enter the nonce code (the second factor of authentication) into the BMC web interface 64. Upon the BMC 50 receiving the nonce code entered by the user, the BMC 50 may pass the entered nonce code to the firmware 30. If the MFA logic 36 determines that the entered nonce code received from the BMC 50 matches the nonce code 38 generated by the MFA logic 36, then the multi-factor authentication has been successfully performed and the firmware setup utility 32 may be unlocked to enable changes to the system configuration 40. Accordingly, the user may further interact with the firmware interface 66 on the computer 60 to confirm or modify the system configuration 40 and/or to view or replace the firmware setup utility password before instructing or otherwise causing the firmware (BIOS/UEFI) 30 to reboot or continue booting.

Figure 2:
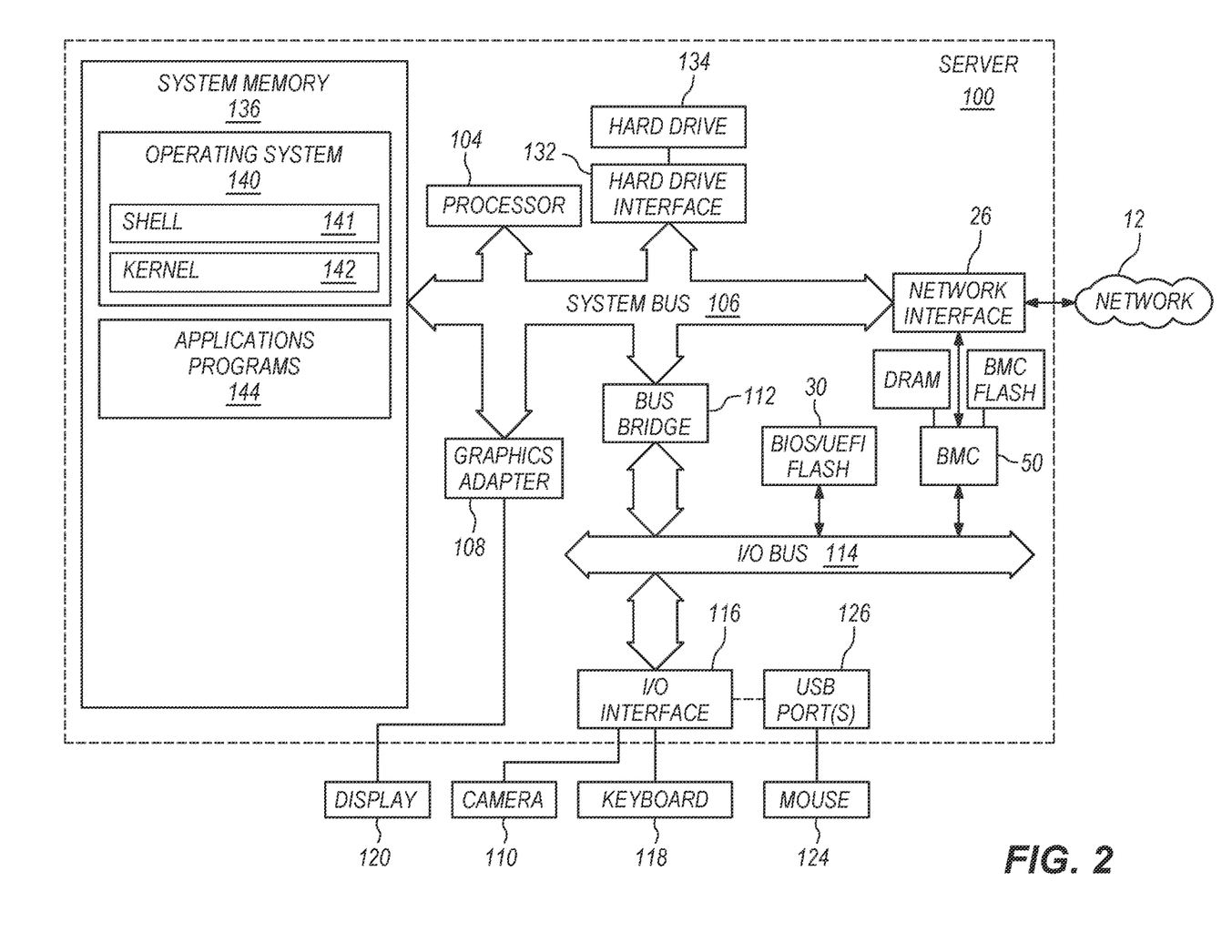
FIG. 2 is a diagram of a computer server according to some embodiments.

FIG. 2 is a diagram of a computer server 100 that may be representative of the computer server 20 shown in the system 10 of FIG. 1. However, the server 100 may also be representative of much of the architecture of the computer 60 and/or the compute mobile/computer 67. Still, the computer 60 and/or the mobile/computer 67 will typically not include a BMC.

The server 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 12 using a network adapter or network interface controller 130.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the server 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer 100 may include application programs 144 stored in the system memory 136.

Still further, the server 100 may include a service processor, such as the BMC 50. The BMC is considered to be an out-of-band controller and may monitor and control various components of the server 100. However, the BMC may communicate with various devices via the network interface 26 and network 12, such as sending an email message to a registered email address and receiving input through a BMC web interface.

Figure 3:
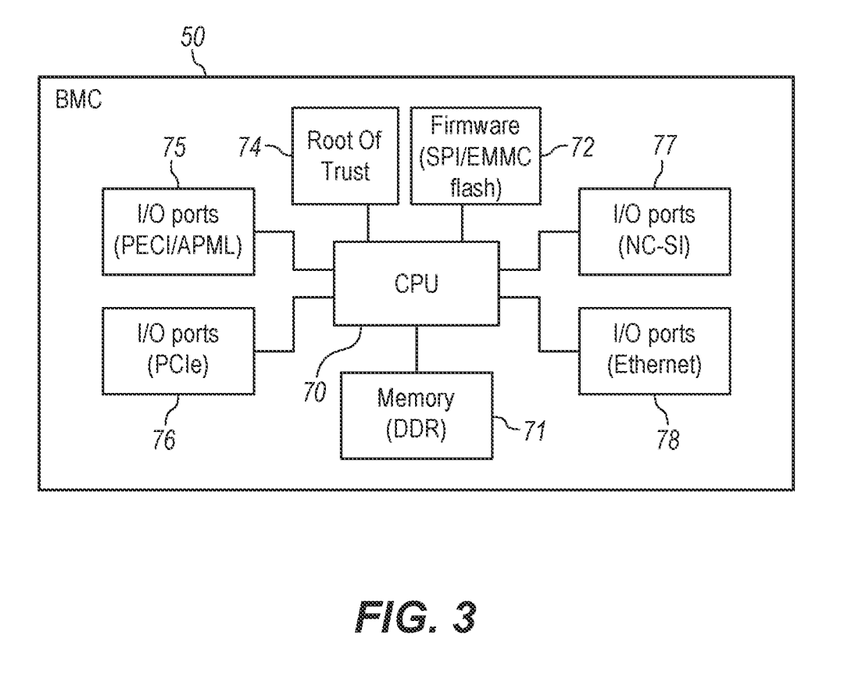
FIG. 3 is a diagram of the baseboard management controller (BMC) according to some embodiments.

FIG. 3 is a diagram of the BMC 50 according to some embodiments. The BMC 50 is similar to a small computer or system on a chip (SoC), including a central processing unit (CPU) 70 (which is a separate entity from the central processing unit 22 in FIG. 1), memory 71 (such as random-access memory (RAM) on a double data rate (DDR) bus), firmware 72 on a flash memory (such as an embedded multi-media card (eMMC) flash memory or a serial peripheral interface (SPI) flash memory), and a root of trust (RoT) chip 74. The BMC 50 further includes a wide variety of input/output ports. For example, the input/output (I/O) ports may include I/O ports 75 to the hardware components of the server, such as a Platform Environment Control Interface (PECI) port and/or an Advanced Platform Management Link (APML) port; I/O ports 76 to the hardware components of the servers and/or a network interface controller (NIC), such as a Peripheral Component Interconnect Express (PCIe) port; I/O ports 77 to the NIC, such as a network controller sideband interface (NC-SI) port; and I/O ports 78 to a network that accessible to an external user, such as an Ethernet port. The BMC 50 may use any one or more of these I/O ports to interact with hardware devices installed on the server to obtain hardware performance data for the hardware devices. Optionally, the output from the BMC 50 to a BMC web interface or Redfish interface may be routed through the I/O ports 78 to a network interface controller (NIC) 26 (see FIG. 1) and ultimately to the network 12 that is accessible through the NIC 26.

Figure 4:
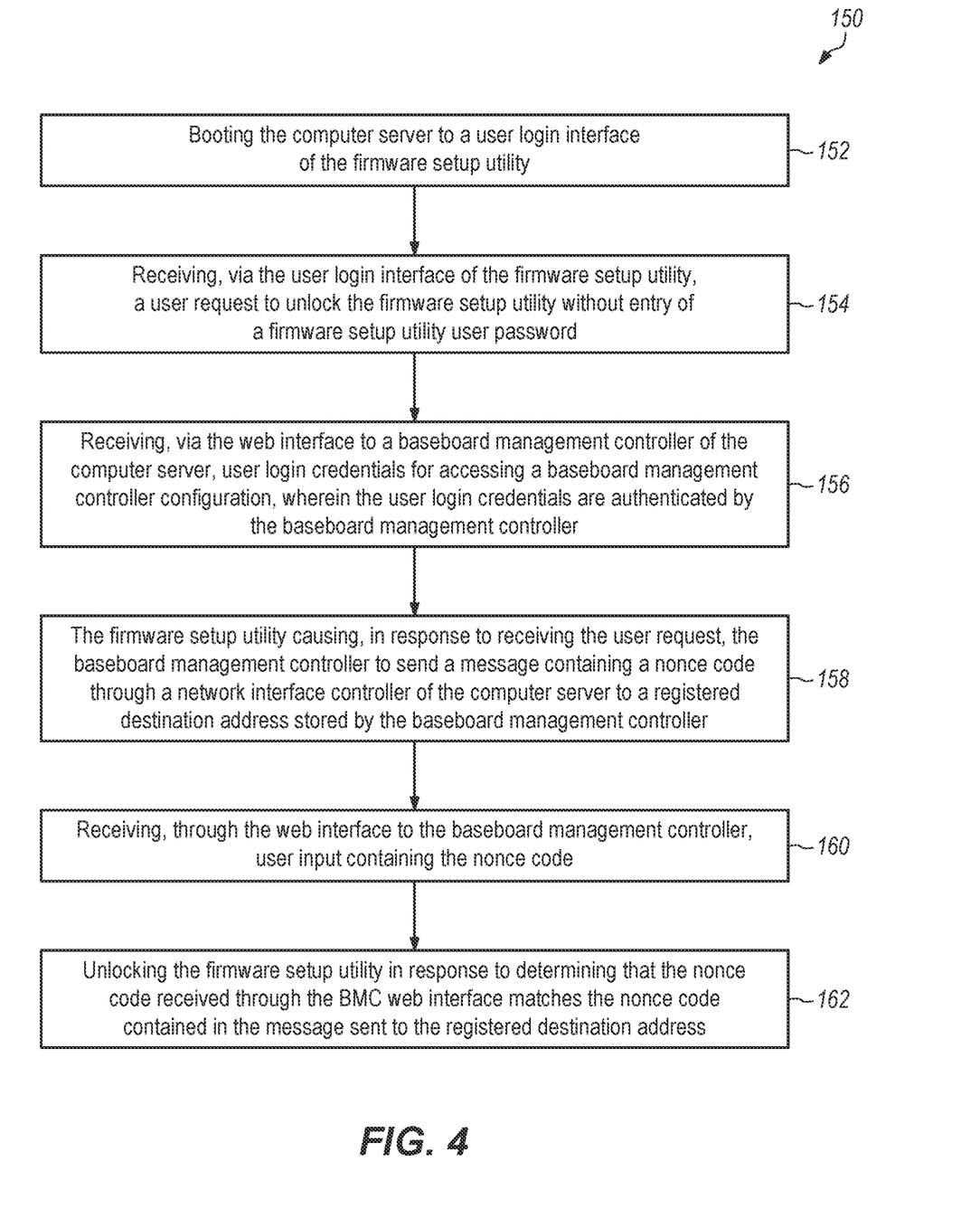
FIG. 4 is a flowchart of operations of a server according to some embodiments.

FIG. 4 is a flowchart of operations 150 of a server according to some embodiments. In the context of the operations in the flowchart, the firmware setup utility locked function has been previously configured to require entry of the firmware setup utility password during an attempted boot process that detects tampering with the system configuration or the physical hardware configuration of the server. Embodiments may further require, as part of the configuration, designation of a registered destination address, such as an email address, in the BMC configuration. The registered destination address informs the BMC where to send the nonce (one time) code to unlock the firmware setup utility when the firmware setup utility is locked by the firmware setup utility password. The registered email address may be stored in the BMC configuration but is protected by the firmware setup utility password such that the registered destination address can only be changed by a user having both the BMC login credentials and the firmware setup utility password. It should be understood that the BMC runs on standby power and is always on, even when the server power state is "off."

Operation 152 includes booting the computer server to a user login interface of the firmware setup utility. The user may intentionally boot to the system firmware setup utility ("F1") during startup of the computer to manually initiate a change in the system configuration, or the computer system may automatically boot to the system firmware setup utility in response to detecting an unauthorized change in the system configuration or physical hardware configuration. In either situation, the system firmware setup utility prompts the user to enter authentication input, such as by entering the firmware setup utility password. The F1 key is commonly the key that a user can press to interrupt normal startup of a computer to enter the firmware setup utility.

Operation 154 includes receiving, via the user login interface of the firmware setup utility, a user request to unlock the firmware setup utility without entry of a firmware setup utility user password. For example, such a user request may be entered if the user has forgotten the firmware setup utility password.

Operation 156 includes receiving, via a web interface to a BMC of the computer server, user login credentials for accessing a BMC configuration, wherein the user login credentials are authenticated by the BMC. Successful entry of the user's BMC login credentials may be considered to be the first factor of authentication.

Operation 158 includes the firmware setup utility instructing or otherwise causing, in response to receiving the user request, the BMC to send a message containing a nonce code through a network interface controller of the computer server to the registered destination address stored by the BMC.

Operation 160 includes receiving, through the web interface to the BMC, user input containing the nonce code. Operation 162 includes unlocking the firmware setup utility (i.e., unlocking of the system configuration) in response to determining that the nonce code received through the BMC web interface matches the nonce code contained in the message sent to the registered destination address. The successful entry of the nonce code may be considered to be the second factor of authentication. After passing the multi-factor authentication process as described, the user may then use the firmware setup utility to confirm or change the system configuration, the physical hardware configuration and/or the firmware setup utility password.

Figure 5:
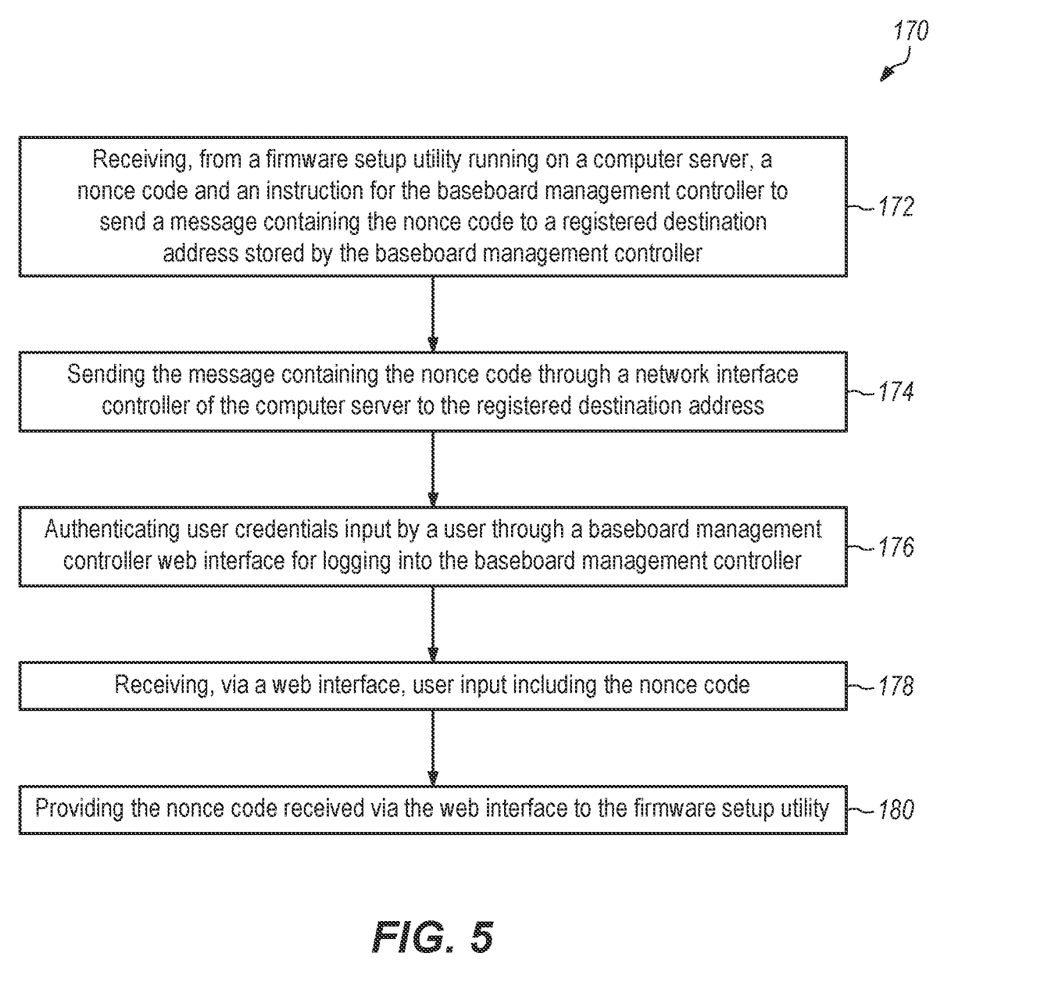
FIG. 5 is a flowchart of operations of a baseboard management controller according to some embodiments.

FIG. 5 is a flowchart of operations 170 of a BMC according to some embodiments. Operation 172 includes receiving, from a firmware setup utility running on a computer server, a nonce code and an instruction for the BMC to send a message containing the nonce code to a registered destination address stored by the BMC. Operation 174 includes sending the message containing the nonce code through a network interface controller of the computer server to the registered destination address. Operation 176 includes authenticating user credentials input by a user through a BMC web interface for logging into the BMC. Operation 178 includes receiving, via a web interface, user input including the nonce code. Operation 180 includes providing the nonce code received via the web interface to the firmware setup utility.

Figure 6:
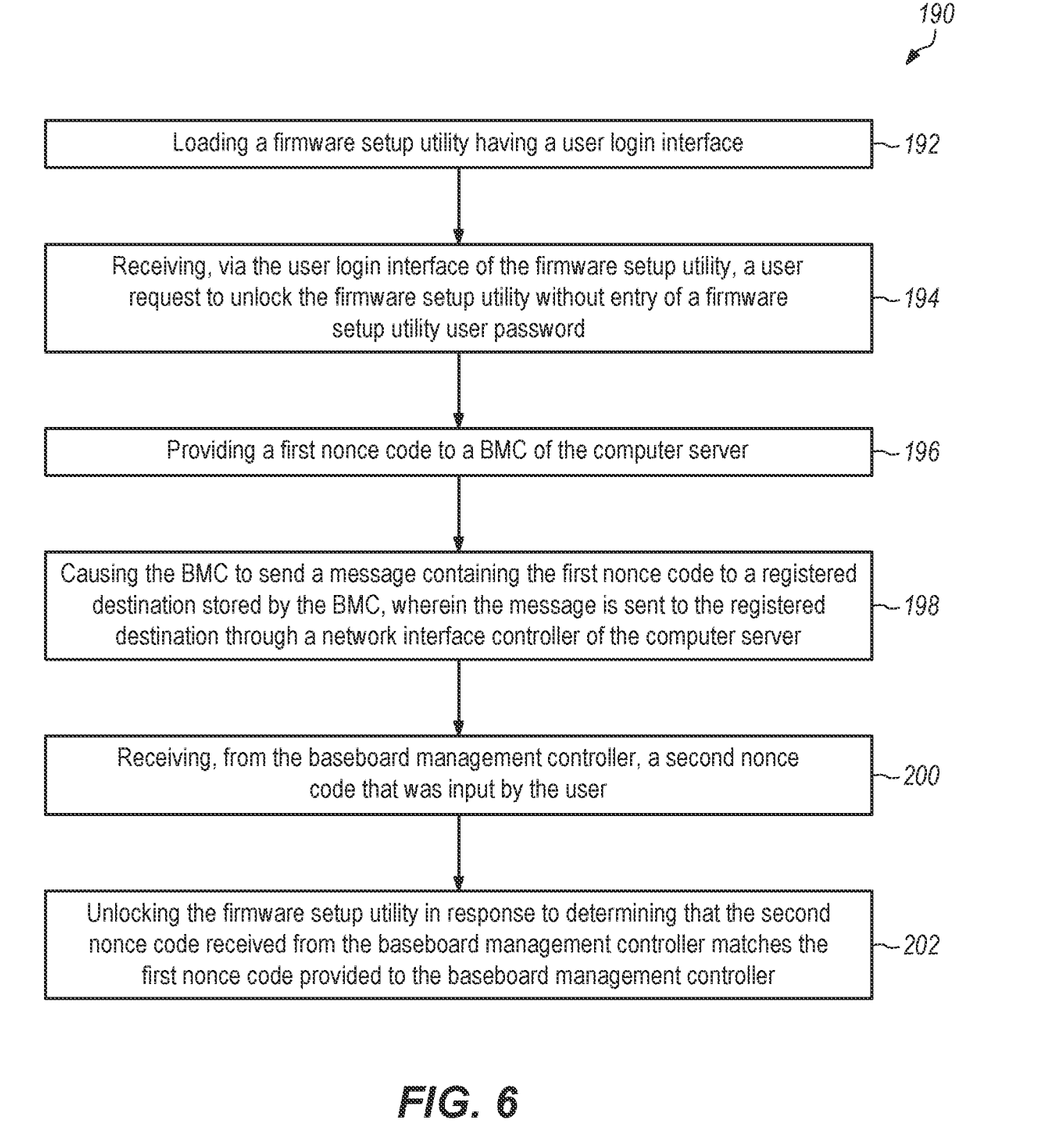
FIG. 6 is a flowchart of operations of a firmware setup utility according to some embodiments.

FIG. 6 is a flowchart of operations 190 of a firmware setup utility having a user login interface, where the firmware setup utility has been loaded in operation 192. Operation 194 includes receiving, via the user login interface of the firmware setup utility, a user request to unlock the firmware setup utility without entry of a firmware setup utility user password. Operation 196 includes providing a first nonce code to a BMC of the computer server. Operation 198 includes instructing or otherwise causing the BMC to send a message containing the first nonce code to a registered destination stored by the BMC, wherein the message is sent to the registered destination through a network interface controller of the computer server. Operation 200 includes receiving, from the BMC, a second nonce code that was input by the user. Operation 202 includes unlocking the firmware setup utility in response to determining that the second nonce code received from the BMC matches the first nonce code provided to the BMC.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method for accessing a firmware setup utility of a computer server without entry of a firmware setup utility user password, comprising:
    booting the computer server to a user login interface of the firmware setup utility;
    receiving, via the user login interface of the firmware setup utility, a user request to unlock the firmware setup utility without entry of a firmware setup utility user password;
    receiving user login credentials for accessing a baseboard management controller configuration, wherein the user login credentials are authenticated by the baseboard management controller;
    the firmware setup utility instructing, in response to receiving the user request, the baseboard management controller to send a message containing a nonce code through a network interface controller of the computer server to a registered destination address stored by the baseboard management controller;
    receiving user input containing the nonce code; and
    unlocking the firmware setup utility in response to determining that the nonce code received through the user input matches the nonce code contained in the message sent to the registered destination address.

2. The method of claim 1, wherein unlocking the firmware setup utility includes unlocking a system configuration for the computer server.

3. The method of claim 1, wherein the firmware setup utility is a setup utility for a basic input-output system and/or a unified extensible firmware interface.

4. The method of claim 1, wherein the computer server does not load an operating system until the firmware setup utility has been unlocked.

5. The method of claim 1, further comprising:
allowing, in response to unlocking the firmware setup utility, the user to establish a new firmware setup utility user password, confirm a system configuration and/or modify the system configuration.

6. The method of claim 5, wherein the system configuration is stored on an erasable programmable read-only memory of the computer server.

7. The method of claim 1, further comprising:
the firmware setup utility generating the nonce code in response to receiving the user request to unlock the firmware setup utility.

8. The method of claim 1, wherein the user login credentials for accessing a baseboard management controller configuration are received by the baseboard management controller through a baseboard management controller web interface, and wherein the user input containing the nonce code is received by the baseboard management controller through the baseboard management controller web interface.

9. The method of claim 8, further comprising:
the baseboard management controller passing the user input containing the nonce code to the firmware setup utility, wherein the firmware setup utility makes the determination that the nonce code received through the baseboard management controller web interface matches the nonce code contained in the message sent to the registered destination address.

10. The method of claim 1, wherein the user login credentials for accessing a baseboard management controller configuration and the user input containing the nonce code are received by the firmware setup utility.

11. The method of claim 1, wherein the registered destination address stored by the baseboard management controller is protected by the firmware setup utility user password.

12. The method of claim 1, further comprising:
automatically determining, during booting of the computer server, whether there have been any unauthorized changes in a system configuration and/or a physical state of the computer server since a previous booting of the computer server, wherein the computer server automatically boots to the user login interface of the firmware setup utility in response to determining that there has been an unauthorized change in the system configuration and/or the physical state of the computer server since a previous booting of the computer server.

13. The method of claim 1, further comprising:
preventing the computer server from booting an operating system until, after unlocking the firmware setup utility, the user has certified trust in the system configuration and/or physical state of the computer server.

14. A computer program product comprising a non-volatile computer readable medium and non-transitory program instructions embodied therein, the program instructions being configured to be executable by a processor of a baseboard management controller to cause the processor to perform operations comprising:
receiving, from a firmware setup utility running on a computer server, a nonce code and an instruction for the baseboard management controller to send a message containing the nonce code to a registered destination address stored by the baseboard management controller;
sending the message containing the nonce code through a network interface controller of the computer server to the registered destination address;
authenticating user credentials input by a user through a baseboard management controller web interface for logging into the baseboard management controller;
receiving, via a web interface, user input including the nonce code; and
providing the nonce code received via the web interface to the firmware setup utility.

15. The computer program product of claim 14, the operations further comprising:
protecting the registered destination address with a firmware setup utility user password.

16. A computer program product comprising a non-volatile computer readable medium and non-transitory program instructions embodied therein, the program instructions being configured to be executable by a processor to cause the processor to perform operations comprising:
receiving, via a user login interface of a firmware setup utility running on a computer server, a user request to unlock the firmware setup utility without entry of a firmware setup utility user password;
providing a first nonce code to a baseboard management controller of the computer server;
instructing the baseboard management controller to send a message containing the first nonce code to a registered destination stored by the baseboard management controller, wherein the message is sent to the registered destination through a network interface controller of the computer server;
receiving, from the baseboard management controller, a second nonce code that was input by the user; and
unlocking the firmware setup utility in response to determining that the second nonce code received from the baseboard management controller matches the first nonce code provided to the baseboard management controller.

17. The computer program product of claim 16, further comprising:
allowing, in response to unlocking the firmware setup utility, the user to establish a new firmware setup utility user password, confirm a system configuration and/or modify the system configuration.

18. The computer program product of claim 16, further comprising:
generating the nonce code in response to receiving the user request to unlock the firmware setup utility.

19. The computer program product of claim 16, further comprising:
automatically determining, during booting of the computer server, whether there have been any unauthorized changes in a system configuration and/or a physical state of the computer server since a previous booting of the computer server, wherein the computer server automatically boots to the user login interface of the firmware setup utility in response to determining that there has been an unauthorized change in the system configuration and/or the physical state of the computer server since a previous booting of the computer server.

20. The computer program product of claim 16, further comprising:
allowing, in response to unlocking the firmware setup utility, the user to establish a new firmware setup utility user password, confirm a system configuration and/or modify the system configuration.

\* \* \* \* \*